Nov. 20, 1956 J. LATZEN 2,771,300
LINKAGE ASSEMBLY FOR VEHICLE STEERING MECHANISM
Filed Aug. 20, 1953. 2 Sheets-Sheet 1
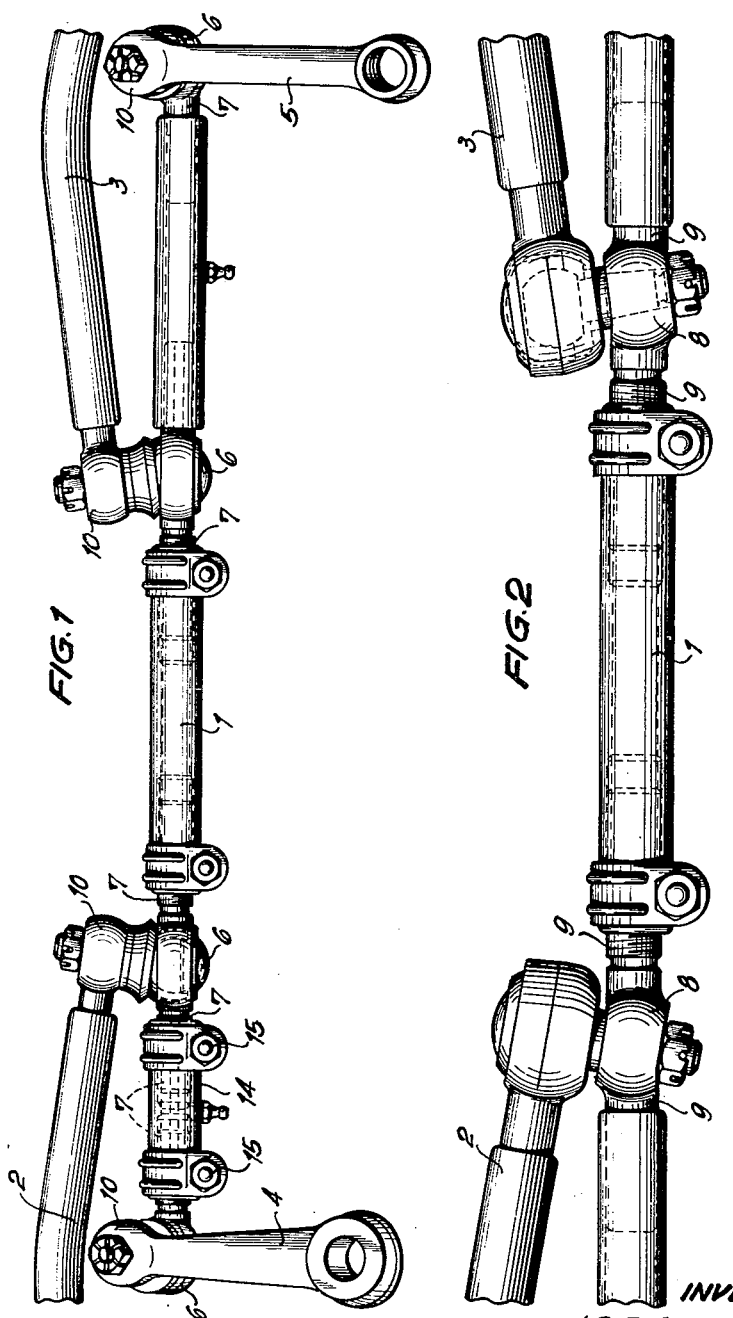
INVENTOR
JOSEF LATZEN
BY Robert R. Jacob.
AGENT Nov. 20, 1956          J. LATZEN          2,771,300
LINKAGE ASSEMBLY FOR VEHICLE STEERING MECHANISM
Filed Aug. 20, 1953          2 Sheets-Sheet 2
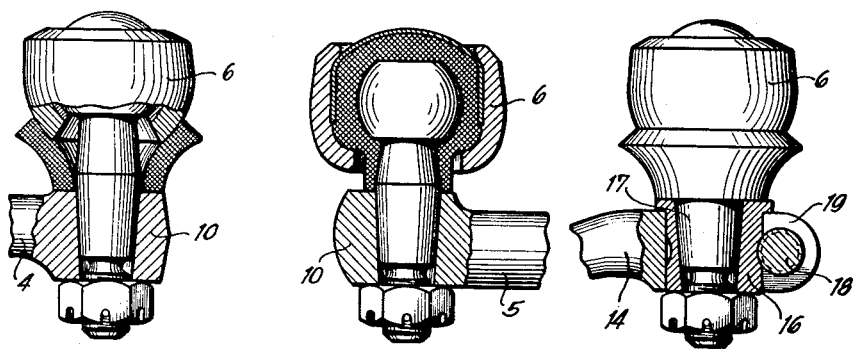
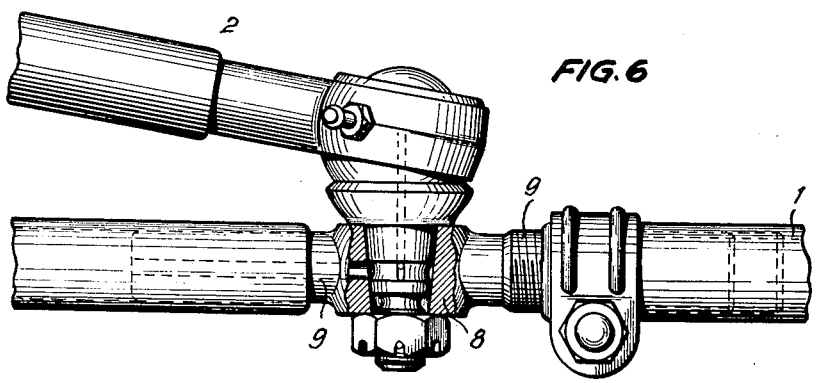
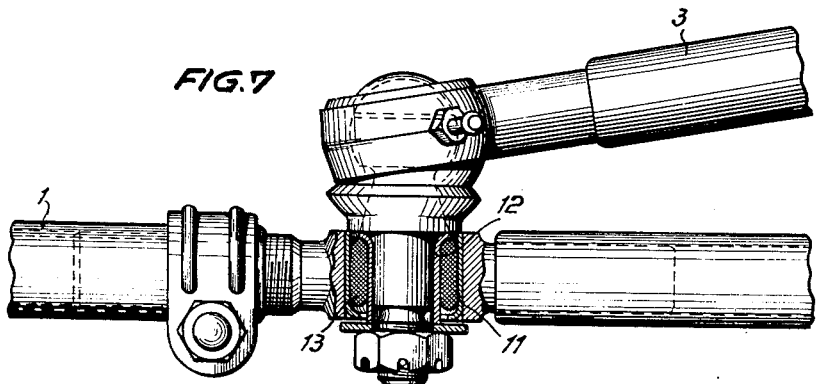
INVENTOR
JOSEF LATZEN
BY Robert K. Jacob
AGENT United States Patent Office 2,771,300
Patented Nov. 20, 1956

2,771,300

LINKAGE ASSEMBLY FOR VEHICLE STEERING MECHANISM

Josef Latzen, Dusseldorf-Oberkassel, Germany, assignor to A. Ehrenreich & Cie.

Application August 20, 1953, Serial No. 375,458

Claims priority, application Germany September 5, 1952

4 Claims. (Cl. 280—95)

The invention relates to a three-part steering linkage, which is intended in particular for motor vehicles, in which the drop arm and guide lever are connected to a central linkage through an articulation or swivel connection of the ball and socket type, and the central linkage, in its turn, is connected to the track rods in each case through an articulation or swivel connection also of the ball and socket type.

In the three-part steering linkages heretofore known, the arrangement is such that the tubular central linkage forms the housing for the connecting joints and accordingly comprises recesses for the insertion of the ball head of a pin, the ball sockets being provided in the central linkage and being pressed against the ball head by springs which are likewise arranged in the central linkage. The drop arm, the guide lever and each track rod are fitted by means of an eye on the ball pin of the pertaining joint. This type of construction of the steering linkage has the disadvantage, on the one hand, that the manufacture of the central linkage with its connections is not simple, and, on the other hand, that the sockets, which are under lateral spring pressure, can undergo displacements in the axial direction of the central linkage, so that there are no kinematically fixed points present as connection points. Furthermore, the sockets can tilt and turn about the axis of the central linkage, with the result that the opening in the sockets for the passage of the ball pin between the sockets and the recess in the linkage for the passage of the ball pivot are no longer in alignment with one another, so that the edges of the openings or the opening cutouts in the sockets are no longer disposed within range of the ball pin and the ball pin is unable to make the necessary deflection when there is a steering movement. Owing to this, steering is rendered very much more difficult. In addition, breakages and fatigue of the springs pressing the sockets against the ball have a detrimental effect on the steering linkage and on the steering.

The above-mentioned disadvantages are obviated, according to the invention, by sub-dividing the central linkage and effecting the swivel or joint connections by means of joints forming independent structural parts which are inserted in the central linkage and connect the subdivisions of the central linkage. In principle, the joints may be of any desired construction, although ball and socket joints are preferably employed. The effect of the arrangement according to the invention is that the joints form kinematically fixed points, whereby the steering linkage constitutes a kinematically fixed system and displacements of the joints, such as are possible with sockets supported behind by springs, as in the case of the hitherto customary steering linkages of the type with which the invention is concerned, cannot occur. In addition, the detrimental effects of fatigue phenomena occurring in the springs which press the sockets against the balls in the known steering linkage connections, or of spring breakages, are eliminated. Above all, the twisting or turning of the sockets, which has heretofore been so prejudicial, can no longer occur, since the central linkage itself, in the construction according to the invention, no longer forms a part of the joint. In the known construction, the central linkage forms the joint housing. Furthermore, the joints can be changed rapidly and simply.

It is possible to insert the independent joints in the central linkage by means of pins on their housings. Another possibility exists in that eyes are inserted in the central linkage with the aid of pins projecting laterally from the said eyes and the joint pin of the joints is secured in the eyes. In this case, the subdivisions of the central linkage are interconnected through the eyes and their pins.

The invention enables the joint for the guide lever to be constructed as an elastic joint or to be provided with an elastic fixing means. This presents the advantage that the connection between the steering linkage and the guide lever absorbs shocks and vibrations and that, moreover, in the case of the construction of the joint as an elastic joint, the central linkage is secured against canting or turning. The construction of the joint as an elastic joint and the elastic joint securing means may also be provided in common.

A further improvement in the steering linkage according to the invention may also be achieved by constructing the joints serving for the transmission of the steering force as elastic joints or providing them with an elastic securing means, it being likewise possible to provide both arrangements at the same time. In this way, on the one hand, elastic connections in the steering linkage, such as, for example, in the form of steering arm shock absorbers, become superfluous, and yet the possibility of length compensation is provided for the joint, and, on the other hand, bending stresses on the joint pin and the effects thereof on the linkage are obviated, when, for example, owing to inaccuracies, angular stresses are produced when there is heavy sagging or springing which would cause an angular movement of the joint beyond the prescribed limit.

It is advisable to effect the connection of the drop arm to the central linkage through a joint, known per se, in which, in the eye for effecting the connection with the joint pin, there is provided an eccentric bushing which is rotatable about the axis of the joint pin and can be fixed in position on the latter. This provides the possibility of adjusting the drop arm in the central position independently of the position resulting on the assembly of the linkage and without making special provision on the central linkage. This is important in particular in two-spoke steering wheels, in order to bring the steering wheel and the spokes into the central position indicating running straight ahead.

The drawing illustrates various embodiments of the invention.

Fig. 1 shows a first embodiment of a three-part steering linkage in plan view.

Fig. 2 is a plan view of the central linkage of a second embodiment.

Fig. 3 shows one of the possible constructional forms of the joint employed in the steering linkage according to Fig. 1.

Fig. 4 shows an elastic joint, such as can be used, for example in Fig. 1, for the guide lever.

Fig. 5 represents an adjustable joint for the drop arm.

Fig. 6 is a joint such as is employed, for example, in the embodiment shown in Fig. 2.

Fig. 7 shows a further form of a joint for this embodiment.

As the drawing shows, the steering linkage consists of the central linkage 1, the two track rods 2 and 3, the drop arm 4 and the automatically following guide lever 5, which is secured to the frame of the vehicle. The connection of the said individual parts to one another is effected through joints 6 forming independent structural parts, which joints are inserted in the central linkage and interconnect the parts thereof.

In the embodiment according to Fig. 1, the joints 6 are formed as ball joints. The ball joints may be of any desired construction. According to Fig. 3, the joints may consist of rigid steel ball joints. In Fig. 1, the ball joints are inserted in the divided central linkage by means of the pins 7 provided on their sockets and screwed by means of suitable threads into the parts of the central linkage, which are thereby interconnected.

The arrangements may also be as shown in Fig. 2, according to which the eyes 8 are inserted in the divided central linkage by means of lateral pins 9 provided on the said eyes. In this case, the joint pins are secured in the eyes. A corresponding arrangement may be used for the connection to the drop arm 4 and to the guide lever 5, or a connection according to Fig. 1 may be used for the connection to the said arm and lever.

In the embodiment according to Fig. 1, the eyes 10 on the track rods, the drop arm and the guide lever are secured on the joint pins. However, the arrangement could also be such that, for example, the central ball joints for effecting the connection with the track rods 2 and 3 are arranged in accordance with Figs. 2 and 6, in which an eye is interposed in the central linkage and the socket or housing of the ball joint is connected to the track rod by a pin, whereas the connection of the guide lever and of the drop arm to the central linkage is effected in accordance with Fig. 1. A reverse arrangement is also possible.

In Fig. 1, all the joints 6 are constructed as non-yielding ball joints. However, it is advantageous to construct the joint for effecting the connection of the guide lever to the central linkage as an elastic joint, as is shown by way of example in Fig. 4, in order in this way, to provide a safeguard against canting or turning of the central linkage. Similarly, the joints for effecting the connection with the track rod and also the joint for effecting the connection with the drop arm can also be constructed as elastic joints. In addition, there is the possibility of constructing some of the joints as elastic joints and others as rigid joints.

Another possibility of obtaining elasticity consists in elastically mounting the joints, as shown, for example, in Fig. 7, wherein a rubber lining or packing 13 between two sleeves 11 and 12 is inserted around the joint pin. This method of securing the joint can be employed both in the embodiment according to Fig. 1 and also in the embodiment according to Fig. 2 or in a combination according to both embodiments, in which, for example, the drop arm and the guide lever are connected to the central linkage in accordance with Fig. 1 and the track rods in accordance with Fig. 2 or vice versa. In this case, some of the joints, for example the joints for effecting the connection with the track rod, may be secured in the manner shown in Fig. 7, whereas the joints for the drop arm 4 and the guide lever 5 are constructed as elastic or as rigid joints. Alternatively, the joints for the drop arm and the guide lever are constructed as elastic joints or joints with elastic securing means, whereas the joints for the track rods are elastic joints or rigid joints having elastic securing means.

In the embodiment according to Fig. 1, the adjustment of the drop arm 4 in the central position is effected by turning the sleeve 14, which forms a part of the central linkage, on the pins 7, one of which has a left-hand thread and the other a right-hand thread. The sleeve 14 is fixed in the adjusted position by means of the clamping collars or clips 15. The adjustment is considerably simplified if, in accordance with Fig. 5, the eye of the drop arm 4 is secured through an eccentric bushing 16 on the joint pin 17. The eccentric bushing 16 can be turned about the axis of the pin for the purpose of adjustment. The fixing of the adjusted position is effected by tightening the slotted eye 19 on the drop arm by means of the screw 18.

I claim:

1. Vehicle steering gear comprising in combination a linkage including at least three longitudinal members and two joint elements disposed between and connecting said longitudinal members in axial alignment to constitute said linkage a continuous unit, a pair of pivot joints, one secured to each free end of said linkage, a guide lever, a drop arm and a pair of track rods; said guide lever and said drop arm being connected to opposite free ends of said linkage each by means of one of said pivot joints; said joint elements being separable units, each presenting a pair of connection members joining a selected two of said longitudinal members and each having a socket joint conformation between said pair of connection members, said track rods being connected to said linkage by way of said socket joints, and said connection members of said joint elements being in the form of studs extending in axial alignment from opposite sides of said joint conformation.

2. Vehicle steering gear comprising in combination a linkage including at least three longitudinal members and two joint elements disposed between and connecting said longitudinal members in axial alignment to constitute said linkage a continuous unit, a pair of pivot joints, one secured to each free end of said linkage, a guide lever, a drop arm and a pair of track rods; said guide lever and said drop arm being connected to opposite free ends of said linkage each by means of one of said pivot joints; said joint elements being separable units, each presenting a pair of connection members joining a selected two of said longitudinal members and each having a socket joint conformation between said pair of connection members, said track rods being connected to said linkage by way of said socket joints, and each socket joint including a ball headed stud engaging one of said socket joint conformations and each joint element having a pair of studs extending in axial alignment at opposite sides therefrom constituting said connection members.

3. Vehicle steering gear in accordance with claim 1, wherein said pivot joint for connecting said drop arm to said linkage includes a bore adapted to receive the stud of a ball headed member and an eccentric bushing disposed intermediate said bore and said stud.

4. Vehicle steering gear in accordance with claim 2, wherein said pivot joint for connecting said drop arm to said linkage includes a bore adapted to receive the stud of a ball headed member and an eccentric bushing disposed intermediate said bore and said stud.

References Cited in the file of this patent

UNITED STATES PATENTS

| | | |
|---|---|---|
| 1,854,938 | Jantsch | Apr. 19, 1932 |
| 1,983,947 | Rockwell | Dec. 11, 1934 |
| 2,049,502 | Hufferd et al. | Aug. 4, 1936 |
| 2,154,558 | Beemer | Apr. 18, 1939 |
| 2,175,429 | Chayne | Oct. 10, 1939 |
| 2,186,287 | Fuchs | Jan. 9, 1940 |
| 2,215,243 | Klages | Sept. 17, 1940 |
| 2,448,851 | Wharam et al. | Sept. 7, 1948 |
| 2,464,982 | Leighton | Mar. 22, 1949 |
| 2,488,979 | Kogstrom | Nov. 22, 1949 |
| 2,660,907 | Alldredge | Dec. 1, 1953 |